J. H. WICKSTROM.
HOG WATERING TROUGH.
APPLICATION FILED MAY 28, 1919.
1,313,146.
Patented Aug. 12, 1919.
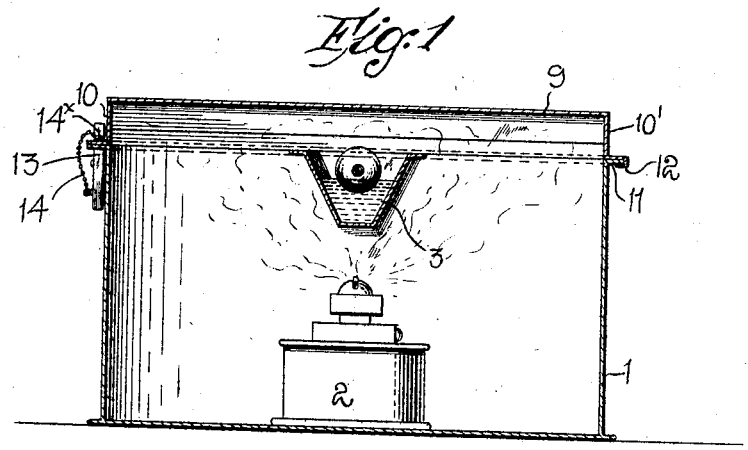
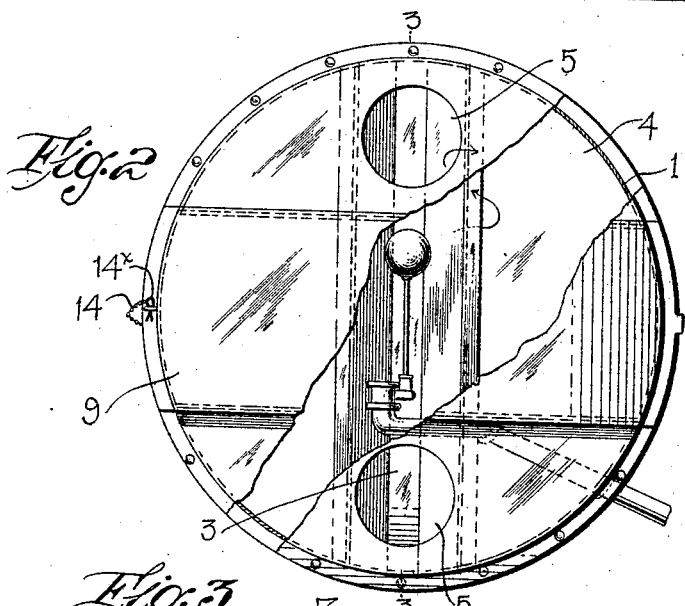
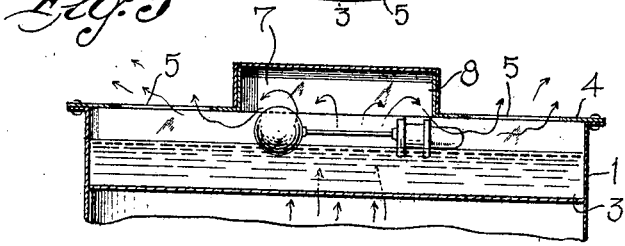
Inventor
J. H. Wickstrom
By Franklin N. Hough
Attorney

UNITED STATES PATENT OFFICE.

JOSEPH H. WICKSTROM, OF BERESFORD, SOUTH DAKOTA.

HOG-WATERING TROUGH.

1,313,146.  Specification of Letters Patent.  Patented Aug. 12, 1919.

Application filed May 28, 1919. Serial No. 300,289.

*To all whom it may concern:*

Be it known that I, JOSEPH H. WICK-STROM, a citizen of the United States, residing at Beresford, in the county of Union and State of South Dakota, have invented certain new and useful Improvements in Hog-Watering Troughs; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention consists of new and useful improvements in hog watering troughs and comprises a simple and efficient apparatus of this character, having various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a central vertical sectional view.

Fig. 2 is a top plan view, parts being broken away to better illustrate details of the invention, and Fig. 3 is a cross sectional view on line 3—3 of Fig. 2.

Reference now being had to the details of the drawings by numerals:

1 designates a casing having a burner 2 therein, and 3 is a trough adapted to contain water to be heated, and is secured to the top 4 of the tank, said top being provided with two circular outlined openings 5 through which two animals may drink at the same time. The top of the tank has a central opening 7 about which is positioned a cylindrical flange 8, and 9 designates a rectangular plate provided with convexed ends, with right angled flanges 10 and 10' adapted to rest upon the flanges 11 of the tank, as shown clearly in Fig. 1 of the drawings. The flange 10' is provided with a hooked extension 12 adapted to engage over the edge of the flange 11, as shown in Fig. 1 of the drawings, while the outer angled end of the flange 10 is apertured to register with an aperture of the tank with which it contacts, and adapted to receive a locking key 13.

A chain 14 is fastened one end to the key and its other end to a pin 14$^x$, adapted to hold the key in place. The plate 9 serves as means for covering the central opening in the top 4 and when removed will give access to the float valve.

It will be noted that the top is so arranged over the double watering apparatus, that water may be prevented from freezing when one lamp is used, as the heat will first be applied to the bottom and sides of the trough and will then pass out over the water, thus making a perfect circulation of heat.

By the provision of the manner of applying the cover it will be noted that the same may be easily removed to attend to the lamp, in the event of the watering apparatus being set within a fence for the use of two yards, one on either side.

By the provision of a hog watering trough made in accordance with my invention, it will be noted that the heater will prevent the water from freezing, as the heat passes through the openings through which the animal drinks and is deflected by the top over a considerable area of the water before making exit through the openings.

What I claim to be new is:

A hog watering trough, comprising a tank having a flange at the upper end, a top secured to said flange, said top having a drinking opening, and a central opening with a flange about the same, a supply pipe with float actuated valve, a plate having a right angled flange at one end and covering said central opening with a contracted hook shaped portion for engagement over the edge of the flange of the tank, its other end having a right angled flange which is apertured to register with an aperture in the flange of the tank, a key passing through apertures in said flanges.

In testimony whereof I hereunto affix my signature.

JOSEPH H. WICKSTROM.

Copies of this patent may be obtained for five cents each, by addressing the "Commissioner of Patents, Washington, D. C."